US012728754B2

(12) United States Patent
Toyora

(10) Patent No.: US 12,728,754 B2
(45) Date of Patent: Sep. 8, 2026

(54) POWER SYSTEM, CONTROL DEVICE, AND POWER SYSTEM CONTROL METHOD

(71) Applicant: TOYOTA JIDOSHA KABUSHIKI KAISHA, Toyota (JP)

(72) Inventor: Sachio Toyora, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 706 days.

(21) Appl. No.: 18/323,506

(22) Filed: May 25, 2023

(65) Prior Publication Data

US 2024/0042885 A1 Feb. 8, 2024

(30) Foreign Application Priority Data

Aug. 5, 2022 (JP) ................................ 2022-125620

(51) Int. Cl.

| | |
|---|---|
| ***H02J 7/00*** | (2026.01) |
| ***B60L 53/53*** | (2019.01) |
| ***B60L 53/62*** | (2019.01) |
| ***B60L 53/63*** | (2019.01) |

(52) U.S. Cl.

CPC ............... *B60L 53/63* (2019.02); *B60L 53/53* (2019.02); *B60L 53/62* (2019.02)

(58) Field of Classification Search

USPC ........................................................ 320/109

See application file for complete search history.

(56) References Cited

U.S. PATENT DOCUMENTS

| | | | | |
|---|---|---|---|---|
| 2015/0283912 | A1* | 10/2015 | Shimizu | B60L 55/00 320/157 |
| 2020/0298720 | A1 | 9/2020 | Ogawa | |
| 2021/0300196 | A1* | 9/2021 | Byun | B60L 53/62 |

FOREIGN PATENT DOCUMENTS

| | | | |
|---|---|---|---|
| JP | 2019062619 A | * | 4/2019 |
| JP | 2020-156149 A | | 9/2020 |

* cited by examiner

*Primary Examiner* — Samuel Berhanu
(74) *Attorney, Agent, or Firm* — Oblon, McClelland, Maier & Neustadt, L.L.P.

(57) ABSTRACT

When EVSE is unable to acquire DR command based on DR transmitted from the servers from HEMS, for example, when communication between HEMS and EVSE is interrupted, and when the battery of the vehicle is discharging (in reverse power flow), the discharge of the battery is stopped and the battery is charged.

4 Claims, 4 Drawing Sheets

1
E1
POWER COMPANY
E2
UPPER AGGREGATOR
E3
LOWER AGGREGATOR
10
11
12
13
13A
PG
20
20A
20B
30
30A
30B
HEMS(GW)
70
40
EVSE
40A
EVSE
50
50A

POWER SYSTEM, CONTROL DEVICE, AND POWER SYSTEM CONTROL METHOD

CROSS-REFERENCE TO RELATED APPLICATION

This application claims priority to Japanese Patent Application No. 2022-125620 filed on Aug. 5, 2022, incorporated herein by reference in its entirety.

BACKGROUND

1. Technical Field

The present disclosure relates to a power system, a control device, and a power system control method.

2. Description of Related Art

In recent years, in order to maintain a supply-demand balance of power supplied from a power grid, a virtual power plant (VPP) of integrating and controlling a plurality of distributed energy resources (DER) like a single power plant has attracted attention. Japanese Unexamined Patent Application Publication No. 2020-156149 (JP 2020-156149 A) discloses that a server of an aggregator communicates with an energy-management system of a customer (for example, a home energy management system (HEMS)) via an energy management system (EMS) network, and the HEMS performs charging and discharging of a battery electric vehicle serving as a DER.

SUMMARY

When the vehicle is used as the DER, a power storage device of the vehicle is charged and discharged via an electric vehicle supply equipment (EVSE). The EVSE is connected to an HEMS controller by a local area network (LAN). The EVSE charges and discharges the power storage device (battery) of the vehicle based on a command from the HEMS controller. The HEMS controller controls the EVSE based on demand response (DR) information received from the server of the aggregator via a dedicated line or an internet line. The HEMS controller also functions as a gateway device that relays the LAN to dedicated line or the internet line.

Since the HEMS controller and the EVSE are connected by the LAN, the communication may become unstable depending on the communication environment. Further, there is a possibility that the HEMS controller temporarily does not operate normally due to a bug or the like of the HEMS controller. The EVSE cannot be controlled based on the DR information when the LAN communication becomes unstable or when the HEMS controller temporarily does not operate normally. For this reason, for example, when the DR information is a request for a lowering DR, the LAN communication becomes unstable while the power storage device is discharging to perform the reverse power flow, and the EVSE cannot acquire the command to stop discharging, since the discharging is continued, the power storage device of the vehicle may be in an over-discharge state.

It is an object of the present disclosure to suppress a power storage device of a vehicle from being in an over-discharge state when an electric vehicle supply equipment (EVSE) cannot acquire a command based on DR information.

A power system of the present disclosure is a power system that includes:

a vehicle provided with a power storage device;

a power supply device that performs transmission and reception of power between a power grid and the vehicle;

a gateway device that acquires DR information transmitted from a server;

a first communication device that performs communication between the power supply device and the gateway device; and a control device.

When the power supply device cannot acquire a command based on the DR information while a reverse power flow from the vehicle is being performed via the power supply device, the control device stops discharging from the power storage device and stops the reverse power flow.

According to this configuration, the vehicle provided with the power storage device performs transmission and reception of power to and from the power grid via the power supply device. The gateway device acquires the DR information transmitted from the server and communicates with the power supply device via the first communication device. When the power supply device cannot acquire a command based on the DR information while a reverse power flow from the vehicle is being performed via the power supply device, the control device of the power control system stops discharging from the power storage device and stops the reverse power flow.

When a communication status of the first communication device becomes unstable, for example, a communication interruption occurs, and the power supply device cannot acquire a command based on the DR information from the gateway device, and when the power supply device is performing a reverse power flow from the vehicle via the power supply device, discharging from the power storage device is stopped and the reverse power flow is stopped. Therefore, when the power supply device is not able to acquire the command based on the DR information, discharge from the power storage device is stopped and thus, discharge from the power storage device is continued and the power storage device can be suppressed from being in an over-discharge state. For example, even when the power supply device cannot acquire the command based on the DR information due to communication between the server and the gateway device becoming unstable and the gateway device not being able to acquire the DR information from the server, discharge from the power storage device is stopped and the power storage device is suppressed from being in the over-discharge state.

The control device may executes control of charging the power storage device from the power grid via the power supply device together with stopping the reverse power flow.

According to this configuration, when the power supply device is unable to acquire the command based on the DR information and the vehicle cannot be used as a DER, the power storage device of the vehicle is charged. Thus, the power for the next travel of the vehicle can be stored. In this case, the power storage device may be fully charged.

The power system further includes a second communication device that performs communication between the vehicle and the power supply device. When communication by the second communication device is abnormal while charging is being executed after the reverse power flow is stopped (discharging is stopped), the control device may stop transmission and reception of power by the power supply device.

According to this configuration, in a state in which an abnormality occurs in the communication by the second communication device such as a case where communication by the second communication device that performs the communication between the vehicle and the power supply device is interrupted, and charging of the power storage device cannot be performed satisfactorily, transmission and reception of power by the power supply device is stopped. Thus, the power storage device can be protected from overcharging and the like.

The control device of the present disclosure is a control device that controls a power supply device that performs transmission and reception of power between a power grid and a vehicle that includes a power storage device.

The control device includes:

- a communication interruption detection unit that detects that the power supply device is not able to acquire a command based on DR information from a gateway device that acquires the DR information from a server; and
- a processing unit that stops discharging from the power storage device and stops a reverse power flow when the communication interruption detection unit detects that a command based on the DR information is not able to be acquired while the reverse power flow from the vehicle is being performed via the power supply device.

According to this configuration, the vehicle provided with the power storage device performs transmission and reception of power to and from the power grid via the power supply device. In the control device that controls the power supply device, a communication interruption detection unit detects that the power supply device is not able to acquire a command based on DR information from a gateway device that acquires the DR information from a server. A processing unit of the control device stops discharging from the power storage device and stops a reverse power flow when the communication interruption detection unit detects that a command based on the DR information is not able to be acquired while the reverse power flow from the vehicle is being performed via the power supply device.

For example, when a communication status between the gateway device and the power supply device becomes unstable and the communication interruption detection unit detects that the power supply device cannot acquire a command based on the DR information from the gateway device, and when the power supply device is performing a reverse power flow from the vehicle via the power supply device, the processing unit stops discharging from the power storage device and stops the reverse power flow. Therefore, when the power supply device is not able to acquire the command based on the DR information, discharge from the power storage device is stopped and thus, discharge from the power storage device is continued and the power storage device can be suppressed from being in an over-discharge state. For example, even when the power supply device cannot acquire the command based on the DR information due to communication between the server and the gateway device becoming unstable and the gateway device not being able to acquire the DR information from the server, discharge from the power storage device is stopped and the power storage device is suppressed from being in the over-discharge state.

The processing unit may execute processing of charging the power storage device from the power grid via the power supply device, together with stopping the reverse power flow.

According to this configuration, when the power supply device is unable to acquire the command based on the DR information and the vehicle cannot be used as a DER, the power storage device of the vehicle is charged. Thus, the power for the next travel of the vehicle can be stored. In this case, the power storage device may be fully charged.

The control device may further include

- a communication abnormality detection unit that detects an abnormality in communication between the vehicle and the power supply device, in which
- when the communication abnormality detection unit detects an abnormality in communication between the vehicle and the power supply device while charging of the power storage device is being executed after the reverse power flow is stopped, the processing unit of the control device may stop transmission and reception of power by the power supply device.

According to this configuration, in a state in which an abnormality occurs in the communication between the vehicle and the power supply device and charging of the power storage device cannot be performed satisfactorily, transmission and reception of power by the power supply device is stopped. Thus, the power storage device can be protected from overcharging and the like.

A control method of a power system of the present disclosure is a control method of a power system including a vehicle equipped with a power storage device, a power supply device that performs transmission and reception of power between a power grid and the vehicle, a gateway device that acquires DR information transmitted from a server, and a communication device that performs communication between the power supply device and the gateway device.

The control method detects that the power supply device is not able to acquire the DR information when a reverse power flow is being performed from the vehicle via the power supply device, and stops discharging from the power storage device and stopping the reverse power flow when the power supply device detects that a command based on the DR information is not able to be acquired.

According to the control method of the power system, while the reverse power flow is being performed from the vehicle via the power supply device, for example, when communication by the communication device becomes unstable and it is detected that the power supply device is not able to acquire a command based on the DR information, discharge from the power storage device is stopped and the reverse power flow is stopped.

Thus, when the power supply device is not able to acquire the command based on the DR information, discharge from the power storage device is stopped and the power storage device is charged from the power grid. Therefore, discharge from the power storage device is continued and the power storage device can be suppressed from being in an over-discharge state.

When the control method detects that the power supply device is not able to acquire the DR information when a reverse power flow is being performed from the vehicle via the power supply device, and when it is detected that a command based on the DR information is not able to be acquired by the power supply device, discharging from the power storage device may be stopped and a reverse power flow may be stopped, and the power storage device may be charged from the power grid via the power supply device. Thus, when the power supply device is not able to acquire the command based on the DR information, discharge from the power storage device is stopped and the power storage device is charged from the power grid. Therefore, it is possible to suppress discharge from the power storage device from being continued and suppress the power storage device from being in the over-discharge state, and store power for the next travel of the vehicle.

According to the present disclosure, when the power supply device is unable to acquire the command based on the DR information, it is possible to suppress the power storage device of the vehicle from being in the over-discharge state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
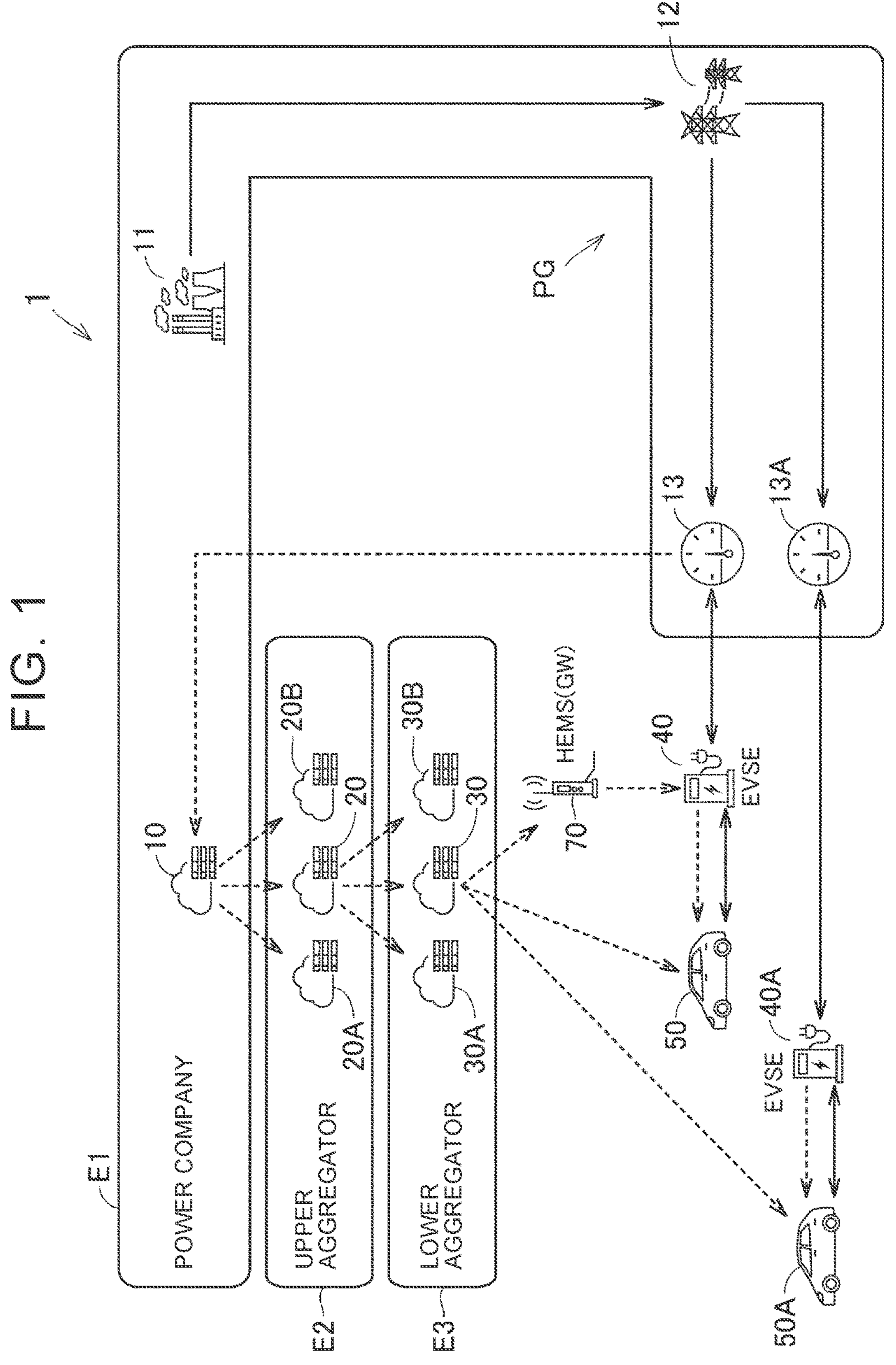
FIG. 1 is a schematic overall configuration diagram of a power system according to the present embodiment.

Hereinafter, embodiments of the present disclosure will be described in detail with reference to the drawings. In the drawings, the same or corresponding parts are denoted by the same reference numerals, and the description thereof will not be repeated.

FIG. 1 is a schematic overall configuration diagram of a power system 1 according to the present embodiment. The power system 1 of the present embodiment is a VPP system. VPP system is a mechanism to bundle a large number of DER by advanced energy management technology using Internet of Things (IoT) and to make it function like a single power plant by remote and integrated control of these DER. In the power system 1 of the present embodiment, a vehicle including a power storage device is used as DER.

The power system 1 includes a plurality of electrified vehicle and a plurality of Electric Vehicle Supply Equipment (EVSE). The number of electrified vehicle and EVSE included in the power system 1 is arbitrary independently, and may be 10 or more, or may be 100 or more. The power system 1 may include at least one of a non-public EVSE (e.g., a home EVSE) that can be used by only a particular user, and a public EVSE that can be used by an unspecified number of users.

The power system 1 includes a power company E1, an upper aggregator E2, and a lower aggregator E3. Electric power company E1 of electric power companies also serves as a power generation company, a power transmission and distribution company, a retail electric power company, and the like. The lower aggregator E3 is a resource aggregator, and is an operator that directly concludes a VPP service contract with a customer and controls a resource (DER). The upper aggregator E2 is, for example, an aggregation coordinator, and is an operator that bundles electric power controlled by a resource aggregator (lower aggregator) E3 and performs direct electric power transactions with the electric power company E1.

Figure 2:
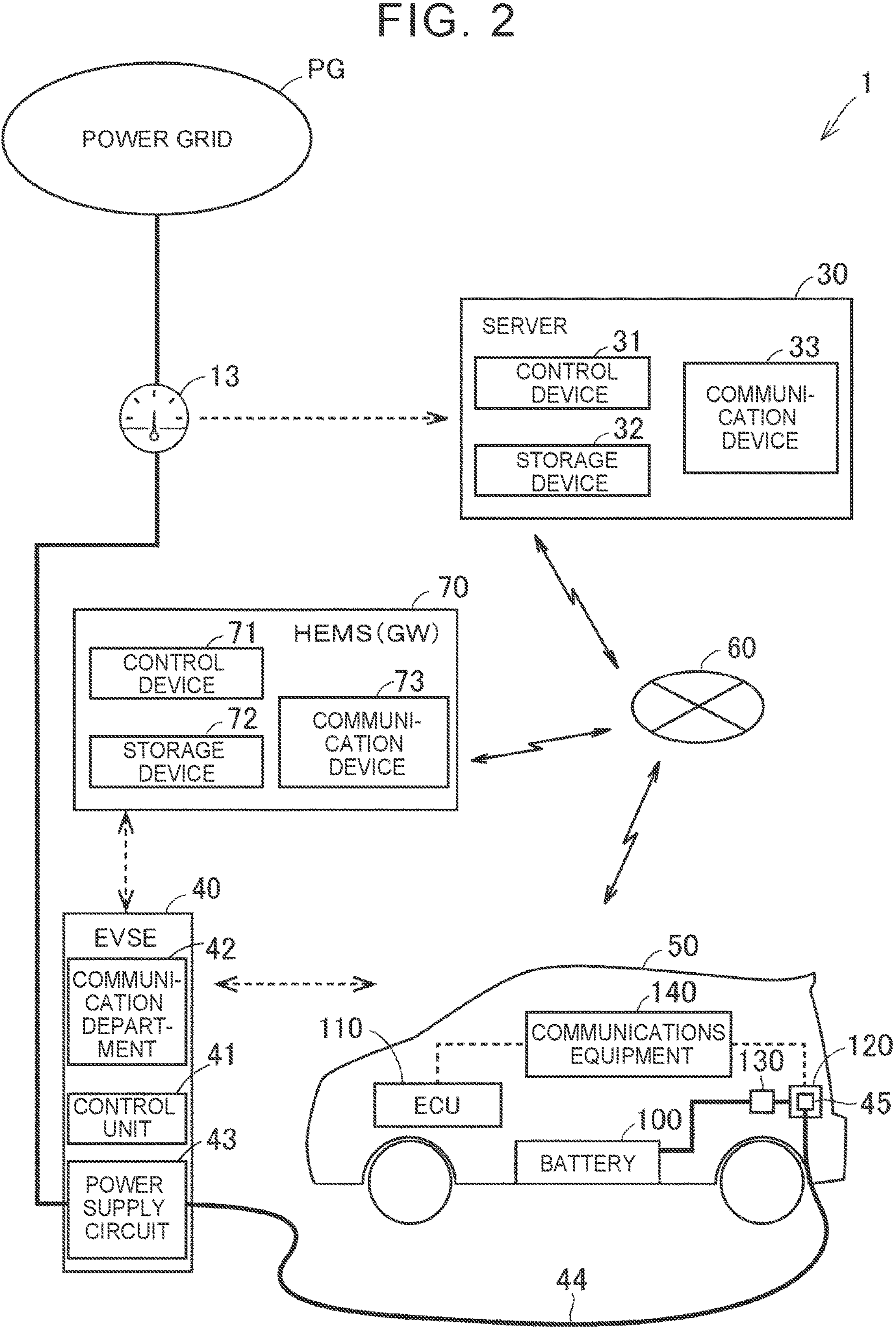
FIG. 2 is a diagram illustrating an example of a communication mode of a server managed by a lower aggregator.

FIG. 2 is a diagram illustrating an exemplary communication mode of the servers 30 managed by the lower aggregator (resource aggregator) E3. The power system 1 includes a power grid PG, a smart meter 13, servers 30, EVSE 40, vehicles 50, EMS networks 60, and HEMS 70.

The vehicle 50 is configured to be able to travel using the electric power stored in the power storage device (battery) 100. The vehicle 50 according to the present embodiment is a battery electric vehicle (BEV that does not include an engine (internal combustion engine), but may be a plug-in hybrid electric vehicle (PHEV). The battery 100 is composed of, for example, a secondary battery such as a lithium-ion battery or a nickel metal hydride battery.

Vehicle 50 includes an Electronic Control Unit (ECU) 110. ECU 110 is configured to perform charge-control and discharge-control of the battery 100. The vehicle 50 includes a monitoring module (not shown) that monitors the state of the battery 100. The monitoring module includes various sensors that detect the status (e.g., voltage, current, and temperature) of the battery 100, and outputs the detected data to ECU 110. It should be noted that the monitoring module may be a Battery Management System (BMS that further includes a State Of Charge (SOC) estimation function, a State Of Health (SOH) estimation function, a cell-voltage equalization function, a diagnostic function, and a communication function in addition to the sensor function.

The vehicle 50 includes an inlet 120 for charging and discharging the battery 100 and a charge/discharge circuit 130. The inlet 120 is configured to exchange electric power with the outside of the vehicle 50. The inlet 120 is configured to be connectable to the connector 45 of the charge/discharge cable 44. When the connector 45 of the charge/discharge cable 44 connected to the main body of EVSE 40 is connected (plugged in) to the inlet 120 of the vehicle 50, the vehicle 50 is brought into a chargeable/dischargeable state (that is, a state in which power can be exchanged with EVSE 40).

EVSE 40 of the present embodiment is a Vehicle to Grid (V2G (or Vehicle to Home (V2H)) compliant power supply device, which converts AC power supplied from the power grid PG into DC power and charges the battery 100. In addition, EVSE 40 is capable of converting DC power discharged from the battery 100 into AC power and supplying the AC power to the power grid PG (reverse power flow). EVSE 40 includes a control unit 41, a communication unit 42, a power supply circuit 43, and a charge/discharge cable 44. The control unit 41, the communication unit 42, and the power supply circuit 43 are provided in the main body of EVSE 40. The charge/discharge cable 44 is connected to the main body of EVSE 40. The charge/discharge cable 44 may be connected to the main body of EVSE 40 at all times, or may be detachable from the main body of EVSE 40. The charge/discharge cable 44 has a connector 45 at its distal end, and includes a power line therein. The control unit 41 controls the communication unit 42 and the power supply circuit 43.

The power grid PG is a power grid provided by the electric power company E1. The power grid PG is electrically connected to a plurality of EVSE (EVSE 40 and supplies AC power to the respective EVSE. The smart meter 13 is configured to measure the amount of electric power every predetermined elapse of time (for example, every 30 minutes), store the measured amount of electric power, and transmit the measured amount of electric power to the servers 10 (see FIG. 1) managed by the electric power company E1. Further, the smart meter 13 transmits the measured electric energy to the servers 30 managed by the lower aggregator E3.

The servers 30 managed by the lower aggregator E3 communicate with the vehicles 50 and HEMS 70 via EMS network 60. EMS network 60 may be a dedicated line, or may be an Internet-based line such as Virtual Private Network (VPN). The communication device 140 mounted on the vehicle 50 communicates with the servers 30 via EMS network 60. The communication device 140 is configured to communicate with the communication unit 42 of EVSE 40 via the charge/discharge cable 44. The communication method between EVSE 40 and the vehicles 50 is optional, and may be, for example, Controller Area Network (CAN) or communication by Control Pilot Line (CPLT) to which Power Line Communication (PLC) is applied. Further, the communication between the vehicles 50 and EVSE 40 may be radio communication using Bluetooth (registered trademark) or the like. The communication unit 42 and the communication device 140 that communicate between EVSE 40 and the vehicles 50 correspond to an exemplary "second communication device" of the present disclosure.

The server 30 includes a control device 31, a storage device 32, and a communication device 33. The control device 31 includes a processor and a memory, and is configured to perform predetermined information processing and control the communication device 33. The storage device 32 is configured to be capable of storing various types of information. The communication device 33 includes various communication OF and is configured to communicate with the outside via EMS network 60.

HEMS 70 is a controller that controls home appliances in a house, and in the present embodiment, it also functions as a gateway device that controls EVSE 40 based on DR from the server 30 and relays the server 30 and EVSE 40. In the present embodiment, EVSE 40 is a non-public EVSE (e.g., a home EVSE) that can be used only by a particular user, and therefore uses a HEMS 70. If EVSE 40 is a public EVSE that can be used by an unspecified number of users, HEMS 70 may be replaced by a business office (for example, a Factory Energy Management System (FEMS installed in a factory or a commercial facility) or a Building Energy Management System (BEMS).

HEMS 70 includes a control device 71, a storage device 72, and a communication device 73. The control device 71 includes a processor and a memory, and is configured to perform predetermined information processing and control the communication device 73. The storage device 72 is configured to be capable of storing various types of information. The communication device 73 includes various communication OF and is configured to communicate with the outside via EMS network 60. The communication device 73 is connected to EVSE 40 communication unit 42 via a LAN, and HEMS 70 also functions as a gateway device that relays EMS network 60 and LAN (relays the server 30 and EVSE 40). LAN may be a wired LAN or a radio Wi-Fi. The communication device 73 and the communication unit 42 that perform communication between HEMS 70 and EVSE 40 correspond to an exemplary "first communication device" of the present disclosure.

Referring to FIG. 1, the electric power company E1 constructs a power grid (the power grid PG shown in FIG. 1) by the power plant 11 and the transmission and distribution facility 12, and maintains and manages the power grid PG by the servers 10. The power plant 11 includes a power generation device and is configured to supply power generated by the power generation device to the power transmission and distribution facility 12. The power generation system of the power plant 11 is arbitrary. The power generation method of the power plant 11 may be any of thermal power, hydraulic power, wind power, nuclear power, and photovoltaic power generation. The transmission and distribution facility 12 includes transmission lines, substations, and distribution lines, and is configured to transmit and distribute power supplied from the power plant 11.

The electric power company E1 can adjust the power of the electric power grid PG by cooperating with an aggregator. The upper aggregator (aggregation coordinator) E2 operates and manages servers (for example, servers 20 and 20A, 20B) for each operator. The lower aggregator (resource aggregator) E3 operates and manages servers (for example, servers 30 and 30A, 30B) for each operator.

In the present embodiment, a DR request is made from the server 10 of the electric power company E1 to the upper aggregator E2 (server) by specifying a time-zone (date and time) in which DR is executed and an electric power quantity based on the predicted electric power demand of the electric power grid PG. If the power demand is tight, a request for DR of lowering is made, and if the power becomes excessive, a request for DR of raising is made. The upper aggregator E2 (server of the aggregator) communicates DR request and the power transaction terms to the lower aggregator E3 (server of the aggregator). Lower aggregator E3 (servers) communicate DR to subscribing customers and control their DER to suit their requirements, taking into account the characteristics and size of DER.

In the present embodiment, the server 10 of the electric power company E1, the server of the upper aggregator E2 (the server 20, 20A, 20B), and the server of the lower aggregator E3 (the server 30, 30A, 30B) are configured to communicate via EMS network 60 (see FIG. 2). As shown in FIG. 2, the servers (the server 30 and 30A, 30B) of the lower aggregator E3 communicate with the customers via EMS network 60.

In FIG. 1, the vehicle 50A and EVSE 40A have substantially the same configuration as the vehicle 50 and EVSE 40. EVSE 40A is connected to the power grid PG via a smart meter 13A. EVSE 40A is not connected to the servers 30 via a HEMS or the like, and is controlled by a vehicle 50A (ECU).

Referring to FIG. 2, upon receiving DR request via EMS network 60, HEMS 70 determines whether DR request can be answered by the vehicle 50. For example, EVSE 40 communicates with the vehicle 50 to acquire vehicle data such as an action schedule (departure date and time, etc.) of the vehicle 50 and a SOC of the battery 100. EVSE 40 transmits the acquired vehicle-information to HEMS 70. HEMS 70 determines whether or not DR request transmitted from the servers 30 can be responded to based on the received vehicle information. If DR request can be answered, HEMS 70 sends a request to join DR request to the servers 30. Note that the vehicle 50 (ECU 110) may determine whether or not to respond to DR request by communication between the vehicle 50 and the server 30, and transmit the join request to the server 30. In addition, the consumer may confirm DR request displayed on the display device (not shown) of HEMS 70 or the display device (not shown) of the vehicle 50, and may make a request to participate in DR based on the judgment of the consumer.

When the vehicles 50 are allowed to participate in DR, DR permissions are transmitted from the servers 30 to HEMS 70. DR permission information is, for example, a DR category (lowering DR/raising DR), a time-zone (date and time) in which DR is executed, a required power amount, and the like. This information enables the consumer to connect the connector 45 of the charge/discharge cable 44 to the inlet 120 of the vehicle 50 at the target date and time.

When DR is executed, the servers 30 transmit DR for executing DR to HEMS 70. DR for executing DR are, for example, DR category (down DR/raising DR), the time at which DR is started, the number of frames for executing DR, and the required power for the respective frames. In the present embodiment, DR is executed in units of frames in which one frame is 30 minutes. In the present embodiment, when DR is raised, power consumed in units of frames (in units of 30 minutes) is transmitted so as to charge the battery 100 of the vehicles 50. In addition, in the down DR, discharge power in units of frames is transmitted so as to discharge the battery 100 of the vehicle 50.

When HEMS 70 receives DR information, it transmits a DR command to EVSE 40 based on DR information. For example, when DR data is in the lowering DR and the required power is A (kW), HEMS 70 discharges the power of A (kW) from the battery 100 to EVSE 40 and transmits a DR command to perform reverse power flow. The "DR command" corresponds to a "command based on DR data" in the present disclosure.

In the present embodiment, DR command from HEMS 70 to EVSE 40 is performed in units of frames (in the present embodiment, in units of 30 minutes). For example, when DR data received from the servers 30 is in a lowering DR in which A (kW) is discharged at four frames from 13:00 to 15:00, when DR is at 13:00 at the execution timing (start timing), a DR command is transmitted from HEMS 70 to EVSE 40 to discharge A (kW) in order to execute the lowering DR at the first frame (up to 13:30). Upon receiving DR command, EVSE 40 controls the power supply circuit 43 and the charge/discharge circuit 130 so as to discharge the power of A (kW) from the battery 100. Then, the timing at which one frame ends (13:30) is DR executing timing of the second frame (up to 14:00), and therefore HEMS 70 to EVSE 40, DR command is transmitted so as to discharge A (kW), and EVSE 40 continues discharging from the battery 100 based on the updated DR command. When the fourth frame ends at 15:00, since the timing is that the lowering DR ends, HEMS 70 transmits a DR command to EVSE 40 to stop the discharge from the battery 100, and EVSE 40 stops the discharge from the battery 100 based on the updated DR command.

Since HEMS 70 and EVSE 40 are connected by LAN, the communication may become unstable depending on the communication environment. In addition, there is a possibility that HEMS 70 does not operate normally temporarily due to a bug or the like of HEMS 70. In a state in which the communication of LAN becomes unstable or a state in which HEMS 70 temporarily does not operate normally, EVSE 40 cannot be controlled based on DR command. Therefore, when there is a request for the lowering DR from the servers 30, and the vehicle 50 (the battery 100) is discharged to perform the reverse power flow, for example, when the communication of LAN becomes unstable and EVSE 40 cannot receive DR command for stopping the discharge of the battery 100 from HEMS 70, the discharge of the battery 100 is not stopped, so that the battery 100 may be over discharged.

In the present embodiment, when EVSE 40 cannot acquire DR command from HEMS 70 while discharging the vehicles 50 (the batteries 100) and performing the reverse power flow, the discharging of the batteries 100 is stopped (the reverse power flow is stopped) to suppress the batteries 100 from being over discharged.

Figure 3:
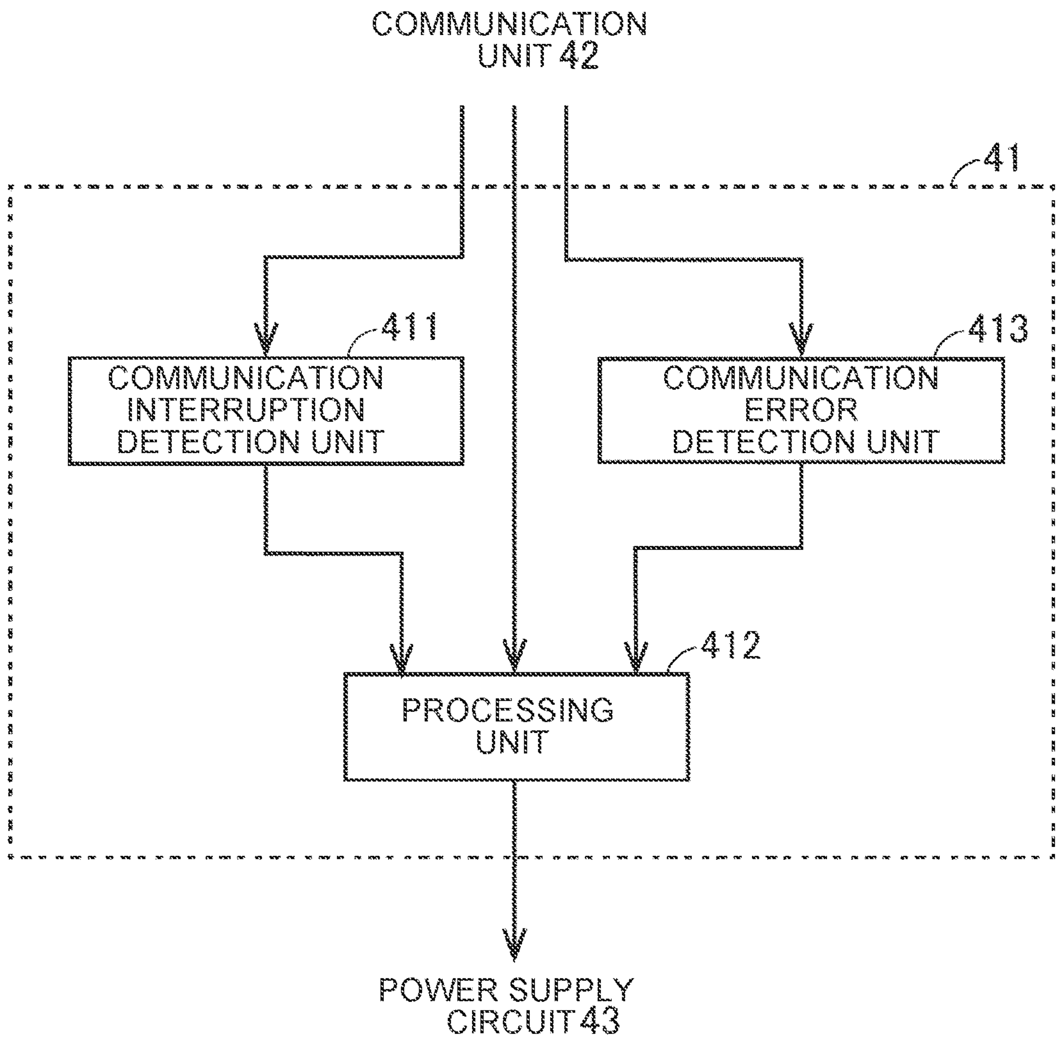
FIG. 3 is a diagram illustrating functional blocks configured in a control unit of an EVSE.

FIG. 3 is a diagram illustrating functional blocks configured in the control unit 41 of EVSE 40. The control unit 41 corresponds to an example of a "control device" of the present disclosure. In FIG. 3, the communication interruption detection unit 411 detects that a command (DR command) based on DR information cannot be acquired from HEMS 70 for acquiring DR information from the servers 30. For example, at 13 o'clock of DR run timing (starting timing), in order to execute the lowering DR of the first frame, as described above, HEMS 70 from the servers 30, at 4 frames from 13 o'clock to 15 o'clock, when receiving DR of the lowering DR for discharging A (kW), from HEMS 70 to EVSE 40, DR command to discharge A (kW) is transmitted. Then, at a timing (13:30) when one frame ends, in order to execute the lowering DR of the second frame (up to 14:00), from HEMS 70 to EVSE 40, DR command to discharge A (kW) is transmitted. For example, when the communication unit 42 does not receive HEMS 70 command from EVSE 40 (when DR command cannot be acquired), the communication interruption detection unit 411 detects that DR command cannot be acquired even when the communication is interrupted between HEMS 70 and EVSE 40 and DR of the first frame is ended (in this example, 13:30). Similarly, even at the timing when DR of the second frame and subsequent frames ends, when the communication unit 42 does not receive DR command from HEMS 70 (when DR command cannot be acquired), it detects that DR command cannot be acquired.

When the communication interruption detection unit 411 detects that DR command cannot be acquired from HEMS 70, and when the vehicle 50 (the battery 100) performs the discharge and performs the reverse power flow, the processing unit 412 controls the power supply circuit 43 to stop the discharge of the battery 100 and charge the battery 100 using the power of the power grid PG. At this time, a charge/discharge command is transmitted to the vehicle 50 (ECU 110) so that the charge/discharge circuit 130 switches from the discharging operation to the charging operation. At this time, the power supply circuit 43 and the charge/discharge circuit 130 may be controlled so that the battery 100 is fully charged.

The communication abnormality detection unit 413 detects a communication abnormality between the vehicle 50 (the communication device 140) and EVSE 40 (the communication unit 42). For example, even if the connector 45 is connected to the inlet 120, it may be detected that the communication between the vehicle 50 (the communication device 140) and EVSE 40 (the communication unit 42) is abnormal, such as when the high-level communication by CPLT is not established or when the communication by CAN is not established.

When the communication abnormality detection unit 413 detects a communication abnormality between the vehicle 50 (the communication device 140) and EVSE 40 (the communication unit 42), when EVSE 40 is charging the battery 100 using the power grid PG force, the processing unit 412 controls the power supply circuit 43 so that the charging of the battery 100 is stopped. Accordingly, the power supply circuit 43 is controlled so that the battery 100 is stopped from being charged when the battery 100 is stopped from being discharged and the battery 100 is being charged using the power of the power grid PG.

Figure 4:
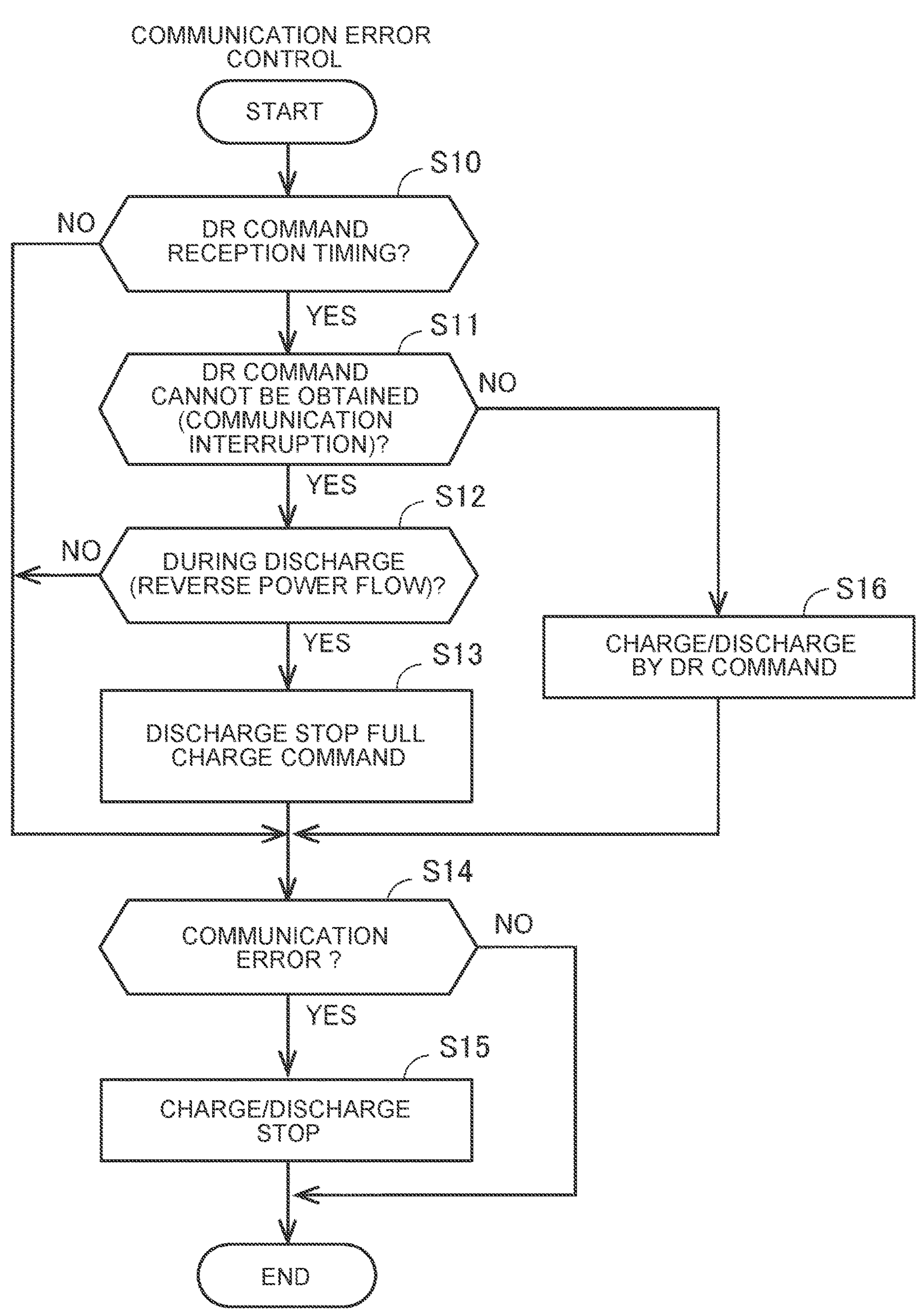
FIG. 4 is a flow chart illustrating an exemplary process of the communication error control executed by the control unit of EVSE.

FIG. 4 is a flow chart illustrating an exemplary process of the communication error control executed by the control unit 41 of EVSE 40. This flow chart is repeatedly processed at predetermined intervals during the operation of EVSE 40. First, in step (hereinafter, step is abbreviated as "S") 10, it is determined whether or not EVSE 40 is a timing for acquiring DR command (command based on DR data) from HEMS 70. For example, based on HEMS 70 transmitted to DR from the servers 30, EVSE 40 stores in advance DR executing timings of the respective frames, and determines whether or not the timings are timings at which DR commands are transmitted from the servers. If the timing at which DR command is transmitted from HEMS 70 is the timing at which DR command is acquired, the determination is affirmative, and the process proceeds to S11. If the timing at which DR command is transmitted from HEMS 70 is not determined to be negative, the process proceeds to S14.

In S11, EVSE 40 determines whether or not DR command (command based on DR data) cannot be acquired from HEMS 70. For example, when communication between the communication device 73 and the communication unit 42 is interrupted due to deterioration of the communication environment of LAN or the like, and the communication unit 42 cannot receive DR command from the communication device 73 at a timing at which HEMS 70 transmits DR command (when DR command cannot be acquired), EVSE 40 determines that DR command cannot be acquired. When DR command cannot be acquired, an affirmative determination is made and the process proceeds to S12. When DR command has been acquired, it is determined to be negative, the process proceeds to S16, charging and discharging by DR command are performed, and the process proceeds to S14. When DR command is to stop charging and discharging, charging and discharging from the battery 100 is stopped in S16.

In S12, it is determined whether or not the battery 100 of the vehicle 50 is discharging and performs reverse power flow. When the battery 100 is discharging and performs reverse power flow, it is determined as affirmative and the process proceeds to S13. If the battery 100 is not discharging and does not perform reverse power flow, the process proceeds to S14.

In S13, discharging from the battery 100 is stopped and the reverse power flow is stopped. At the same time, the power supply circuit 43 is controlled so that the battery 100 is fully charged, and a full charge command is transmitted to the vehicle 50. The vehicle 50 (ECU 110) receives the full charge command and controls the charge/discharge circuit 130 so that the battery 100 becomes fully charged.

In the following S14, it is determined whether or not there is an anomaly in communication between the vehicles 50 (the communication device 140) and EVSE 40 (the communication unit 42). For example, even if the connector 45 is connected to the inlet 120, if the high-level communication by CPLT is not established, or if the communication by CAN is not established, it is determined that there is an anomaly in the communication between the vehicles 50 and EVSE 40, an affirmative determination is made, and the process proceeds to S15. If there is no error in the communication between the vehicles 50 and EVSE 40, a negative determination is made, and the present routine is ended.

In S15, the power supply circuit 43 is controlled so that charging and discharging from the battery 100 are stopped, and the present routine is ended.

If the communication of LAN is restored after the communication between the communication device 73 and the communication unit 42 is interrupted due to the deterioration of the communication environment of S11 and EVSE 40 is determined not to be able to acquire DR command, the communication is determined to be negative. In S16, charging and discharging according to DR command are executed.

In the present embodiment, HEMS 70 (gateway device) acquires DR data transmitted from the servers 30. Then, when the communication status between the communication device 73 and the communication unit 42 (the first communication device) that performs communication between HEMS 70 and EVSE 40 becomes unstable, for example, a communication interruption occurs, and EVSE 40 cannot acquire a command (DR command) based on DR data from EVSE 40, and when the reverse power flow is performed from the vehicles 50 (the batteries 100) via HEMS 70, discharging from the batteries 100 is stopped and the reverse power flow is stopped. Therefore, when EVSE 40 cannot acquire DR command, the discharge from the battery 100 is stopped, so that the discharge from the battery 100 continues and the battery 100 can be suppressed from being over discharged. Further, since the communication between the server 30 and HEMS 70 becomes unstable and DR command cannot be acquired by EVSE 40 due to the fact that HEMS 70 cannot acquire the data from the server 30, the discharging from the battery 100 is stopped, and therefore, also in this case, the battery 100 is suppressed from being over discharged.

In the present embodiment, when EVSE 40 cannot acquire DR command and the reverse power flow is performed, discharging from the battery 100 is stopped and the battery 100 is controlled to be fully charged. When EVSE 40 cannot acquire DR command and the vehicle 50 (the battery 100) cannot be used as DER, the battery 100 is charged, so that electric power for the next travel of the vehicle 50 can be stored. In this case, the charge amount of the battery 100 may not be fully charged. For example, the charging history may be stored, and a charging command may be issued so that the charging amount becomes the same as the charging amount when charging is performed on the same day of the past week. By issuing a charging command so that the battery 100 becomes fully charged, the logic of the charging command can be simplified.

In the present embodiment, when an error occurs in communication between the communication device 140 and the communication unit 42 (the second communication device), which performs communication between the vehicles 50 and EVSE 40, charging and discharging of the battery 100 is stopped. Therefore, when the communication between the vehicles 50 and EVSE 40 is abnormal when the charge is being performed after the stop of the reverse power flow (the stop of the discharging of the battery 100), the transfer of electric power by EVSE 40 is stopped. Thus, when communication between the vehicles 50 and EVSE 40 is interrupted or the like, an error occurs in the communication, and the battery 100 cannot be charged satisfactorily, the transfer of electric power by EVSE 40 is stopped, and thus the battery 100 can be protected from overcharge or the like.

Note that communication between HEMS 70 and the plurality of EVSE may be interrupted in a configuration in which a plurality of EVSE are controlled by HEMS 70. When a communication interruption occurs during reverse power flow in each EVSE, the reverse power flow (discharging from the battery) is stopped in each EVSE. Then, the vehicles connected to the respective EVSE are charged so as to be fully charged. When the charging power becomes excessively large (for example, when the charging power exceeds the contract capacity), the charging operation of EVSE to which battery electric vehicle (BEV is connected takes precedence over the charging operation of plug-in hybrid electric vehicle (PHEV to which the charging power is connected. In this way, charge to battery electric vehicle (BEV) without the internal combustion engine is prioritized.

In the above-described embodiment, EVSE 40 control unit 41 has the functional blocks illustrated in FIG. 3.

However, some or all of the functional blocks illustrated in FIG. 3 may be configured in ECU 110 of the vehicles 50. Similarly, some or all of the processes of the flow chart shown in FIG. 4 may be performed ECU 110 the vehicles 50. Here, the control unit 41 and ECU 110 correspond to an exemplary "control device" of the present disclosure.

In the above-described embodiment, the communication interruption detection unit 411 (see FIG. 3) and S10, S11 (see FIG. 4) detect (determine) whether or not DR command can be acquired at the timing of receiving DR command. However, a monitoring function for constantly monitoring the communication status between HEMS 70 (communication device 73) and EVSE 40 (communication unit 42) may be provided, and when the communication between HEMS 70 and EVSE 40 is interrupted by the monitoring function, it may be detected (determined) that DR command cannot be acquired by EVSE 40.

The embodiment disclosed herein should be considered as illustrative and not restrictive in all respects. The scope of the present disclosure is defined not by the above description of the embodiments but by the claims, and is intended to include all possible modifications within a scope equivalent in meaning and scope to the claims.

What is claimed is:

1. A power system comprising:
- a vehicle provided with a power storage device;
- a power supply device that performs transmission and reception of power between a power grid and the vehicle;
- a gateway device that acquires demand response (DR) information transmitted from a server;
- a first communication device that performs communication between the power supply device and the gateway device;
- a second communication device that performs communication between the vehicle and the power supply device; and
- a control device, wherein
- when the power supply device is not able to acquire a command based on the DR information while a reverse power flow from the vehicle is being performed via the power supply device, the control device stops discharging from the power storage device and stops the reverse power flow,
- the control device executes control of charging the power storage device from the power grid via the power supply device together with stopping the reverse power flow,
- when communication by the second communication device is abnormal while charging of the power storage device is being executed, the control device stops transmission and reception of power by the power supply device, and
- DR commands from the gateway device to the power supply device are transmitted and executed in frame units.

2. The power system according to claim 1, wherein each of the frame units corresponds to a predetermined time interval, and the power supply device expects a new DR command at each of the frame units.

3. A control device that controls a power supply device that performs transmission and reception of power between a power grid and a vehicle that includes a power storage device, the control device comprising:
- a communication interruption detection unit that detects that the power supply device is not able to acquire a command based on demand response (DR) information from a gateway device that acquires the DR information from a server;
- a processing unit that stops discharging from the power storage device and stops a reverse power flow when the communication interruption detection unit detects that the DR information is not able to be acquired while the reverse power flow from the vehicle is being performed via the power supply device; and
- a communication abnormality detection unit that detects an abnormality in communication between the vehicle and the power supply device, wherein
- the processing unit executes processing of charging the power storage device from the power grid via the power supply device together with stopping the reverse power flow,
- when the communication abnormality detection unit detects an abnormality in communication between the vehicle and the power supply device while charging of the power storage device is being executed, the processing unit stops transmission and reception of power by the power supply device, and
- DR commands from the gateway device to the power supply device are transmitted and executed in frame units.

4. A control method of a power system including a vehicle equipped with a power storage device, a power supply device that performs transmission and reception of power between a power grid and the vehicle, a gateway device that acquires demand response (DR) information transmitted from a server, and a communication device that performs communication between the power supply device and the gateway device, the control method comprising:
- detecting that the power supply device is not able to acquire the DR information when a reverse power flow is being performed from the vehicle via the power supply device;
- stopping discharging from the power storage device and stopping the reverse power flow when the power supply device detects that the DR information is not able to be acquired;
- executing charging of the power storage device from the power grid via the power supply device together with stopping the reverse power flow; and
- when communication between the vehicle and the power supply device is abnormal while charging of the power storage device is being executed, stopping transmission and reception of power by the power supply device,
- wherein DR commands from the gateway device to the power supply device are transmitted and executed in frame units.

* * * * *